United States Patent [19]
Farnsworth

[11] Patent Number: 5,067,055
[45] Date of Patent: Nov. 19, 1991

[54] AUTOMOBILE HEADLAMP AND ROTATABLE SIDELAMP OF INTEGRATED CONSTRUCTION AND SWITCHING CIRCUIT FOR OPERATING SAME

[76] Inventor: Elmer D. Farnsworth, 9860 Brownlee Rd., Sweet, Id. 83670

[21] Appl. No.: 538,824

[22] Filed: Jun. 15, 1990

[51] Int. Cl.$^5$ .............................................. B60Q 1/06
[52] U.S. Cl. ...................................... 362/66; 362/269; 362/428
[58] Field of Search .................... 362/61, 80, 66, 35, 362/269, 285, 418, 419, 427, 428

[56] References Cited

U.S. PATENT DOCUMENTS

| | | | |
|---|---|---|---|
| 1,164,738 | 12/1915 | Meeker | 362/269 |
| 1,533,496 | 4/1925 | Dollar | 362/66 |
| 1,629,342 | 5/1927 | Juhasz | 362/66 |
| 2,645,761 | 7/1953 | McDowell et al. | 362/66 |
| 4,855,878 | 8/1989 | Vu et al. | 362/66 |

Primary Examiner—Ira S. Lazarus
Assistant Examiner—Sue Hagarman
Attorney, Agent, or Firm—William J. Bethurum

[57] ABSTRACT

An integrated combination of a headlamp section and a sidelamp section for a vehicle, with the sidelamp section being oriented and rotatable at a predetermined wrap-around side facing angle with respect to the forward lighting direction of the headlamp section. This angle may be typically on the order of 90° so that the sidelamp provides good continuous wrap-around side lighting and good night vision for persons riding in the vehicle or exiting therefrom. The sidelamp section may be operated in response to the turning on and off of the dimmer bulb within the headlamp section or it may be operated independently of the operation of the dimmer bulb by the use of an OR gate logic circuit in combination with an electro-mechanical relay and switch. This circuit is operable for energizing and de-energizing the relay and switch in response to power applied to any one of a plurality of parallel connected inputs of the OR gate logic circuit. In addition, one of these inputs is connected to operate a sidelamp rotational motion control stage for controlling the rotational motion of the sidelamp in both horizontal and vertical planes to thereby provide automatic and instantaneous side lighting for the automobile.

4 Claims, 3 Drawing Sheets

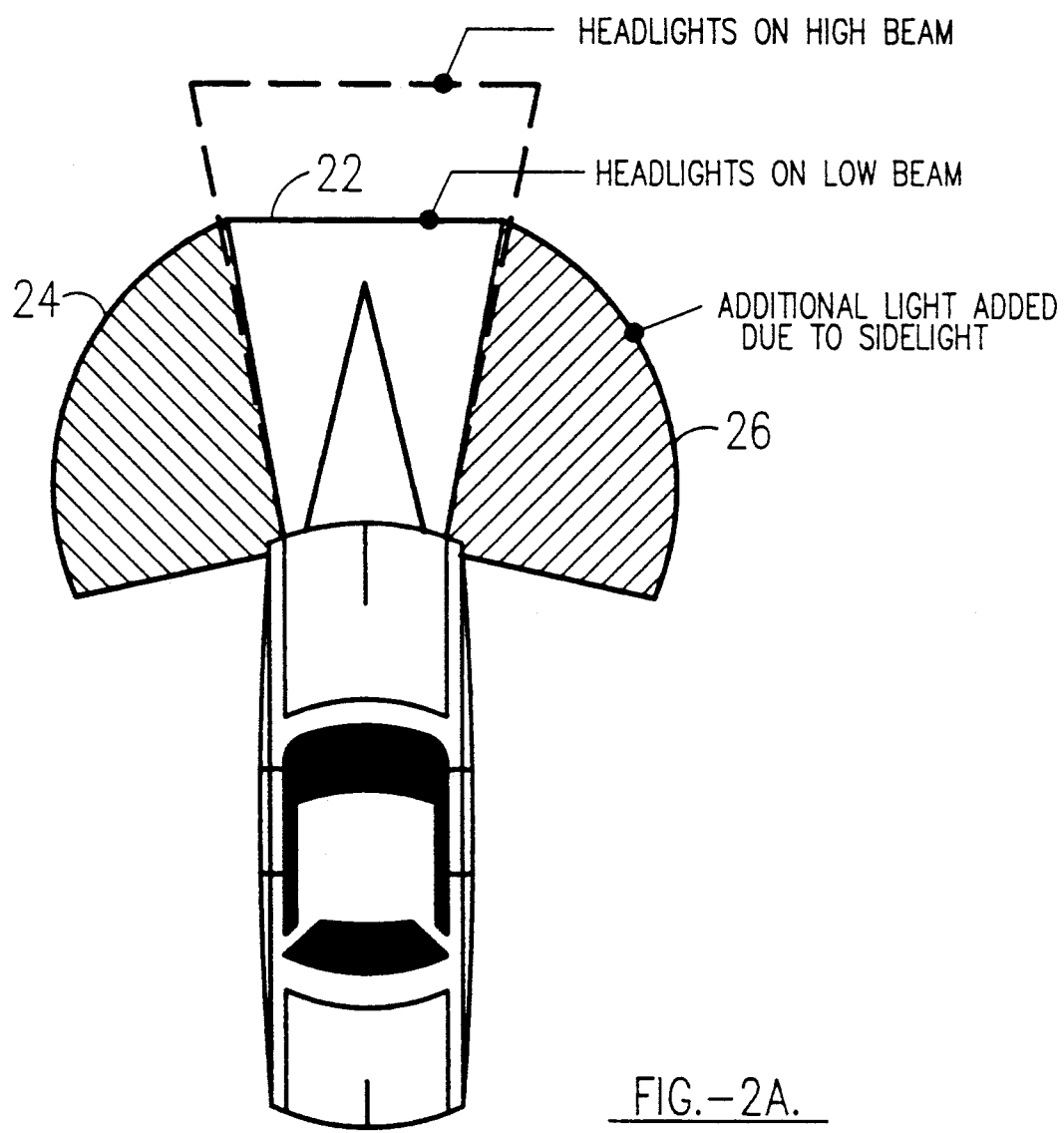
FIG.—2A.

AUTOMOBILE HEADLAMP AND ROTATABLE SIDELAMP OF INTEGRATED CONSTRUCTION AND SWITCHING CIRCUIT FOR OPERATING SAME

TECHNICAL FIELD

This invention relates generally to the design of automobile headlamps and more particularly to such design featuring a novel combination of headlamp and sidelamp of integrated construction and an electrical switching circuit for use therewith.

BACKGROUND ART

Various sidelamp designs have been used on automobiles over the years, and these include roof mounted sidelamps, door mounted sidelamps, and fender mounted sidelamps of various construction. Examples of roof mounted automobile sidelamps are described, for example, in U.S. Pat. No. 2,065,867 issued to Seigfried and also in U.S. Pat. No. 2,086,524 issued to Clark. However, to the best of my knowledge the above designs do not provide good side lighting which extends from and is integral with the headlamp of an automobile and is operable therewith in a novel, rotatable and versatile manner. In addition, as far as is known, the above sidelamp designs of the prior art do not provide simplified switching schemes which will allow the sidelamp to be operated either simultaneously with the headlamp or independently thereof as a function of other automobile lighting functions or manually. Furthermore, none of the prior art side lighting schemes examined to date provide rotational side lighting from a sweep position immediately adjacent to a main headlight in order to allow continuous lighting and surveillance from a forward looking direction and through a sweep angle of ninety (90) degrees to a direction which is approximately perpendicular to the side door of an automobile.

DISCLOSURE OF INVENTION

The general purpose and principal object of the present invention is to provide a new and improved combination of integrated headlamp-sidelamp construction for an automobile. This construction features good smooth, continuous and adjustable side lighting for a vehicle directly adjacent to and as a lighting extension of automobile head lighting in a simplified wrap-around bulb, reflector and glass design. This integrated combination is economical to manufacture and is elegantly simple in its operation and overall appearance.

Another object of this invention is to provide a new and improved switching circuit arrangement useful for operating the side lamp either simultaneously with the functioning of the dimmer bulb of the automobile headlamp or independently thereof in response to other interior lighting functions within the vehicle or in response to a manual switch.

Another object of this invention is to provide a sidelamp construction for an automobile which may be swept horizontally through an angle of ninety degrees or more with respect to the direction of automobile travel and also rotatable vertically in order to provide a widely variable field-of-view (FOV) for the aid of passengers departing the automobile at night.

Another object of this invention is to provide an automobile sidelamp of the type described which may be operated automatically by the driver of an automobile to sweep the field of illumination of the sidelamp past the driver's normal field of view and into his well known "blind spot". As is well known, this "blind spot" starts where the driver's peripheral vision ends, and this feature can be extremely useful at night where the automobile is travelling in an isolated area and where the sidelamp rotation would not interfere with the operation of another automobile.

To accomplish this purpose and related objects, there is provided in accordance with the novel teachings herein, in combination: a main headlamp bulb, reflector and glass section which is constructed integrally with a rotatable side lighting bulb, reflector and glass section in a smooth wrap-around contour at or adjacent to the front fender of the automobile. Since the side lamp normally does not require as much illumination power as the headlamp, the sidelamp section of this design may be made somewhat smaller than that of the headlamp section. However, the sidelamp section has the same general contour as that of the headlamp section in order to enhance appearance and manufacturability of these two lamp sections from similar, but scaled down molds. This design is characterized by a smooth contour extending from an extreme boundary of the headlamp section and through the interface boundary between the headlamp and sidelamp sections to the extreme outer boundary of the sidelamp section. The globe of the sidelamp section is vertically offset lower than the globe of the headlamp section and may, for example, be centered on a line of about 20° with respect to horizontal as is described in more detail below.

A novel feature of this invention is the provision of logic type switching circuit including a plurality of parallel wired diodes which are connected to a relay used for controlling both power for and rotational motion to the sidelamp. These parallel wired diodes may, for example, be connected to interior automobile lighting functions such as panel lights, dome lights, or other interior lights in addition to being electrically connected to the dimmer light of the automobile headlamp. Thus, these independent automobile lighting functions may be used to energize the relay for the sidelamp independently of the operation of the dimmer light to in turn connect power to the sidelamp section of the present lighting assembly, and turn on and rotate the sidelamp in combination with any one of these independent lighting functions within the automobile.

The above and other objects and features of this invention and advantages thereof will become readily apparent in the following description of the accompanying drawings.

BRIEF DESCRIPTION OF THE DRAWINGS

FIG. 2A is a plan view illustrating the field-of-view (FOV) of the sidelamp in its extreme forward direction.

DESCRIPTION OF THE PREFERRED EMBODIMENT

Figure 1A:
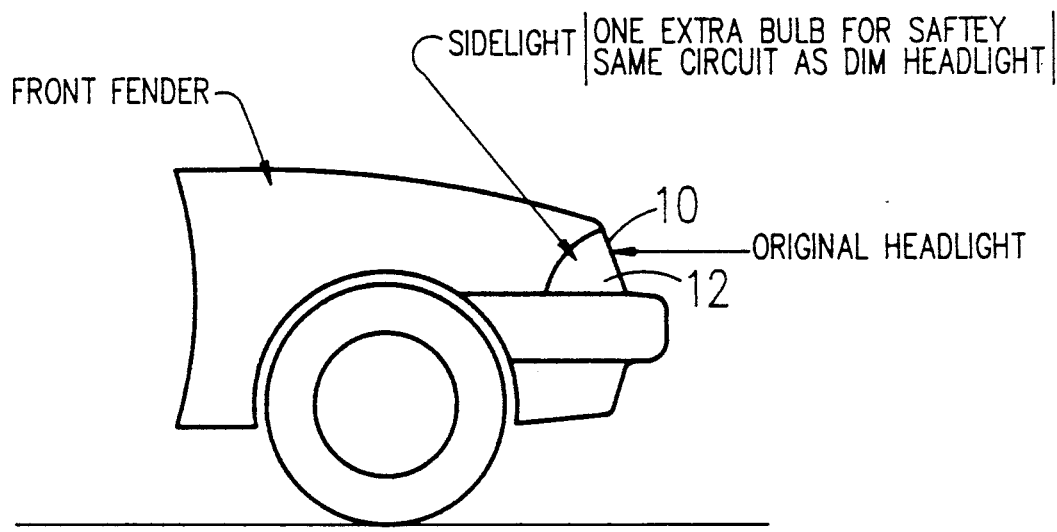
FIG. 1A is an schematic view showing the positioning of the combination headlamp-sidelamp assembly according to the present invention.
Figure 1B:
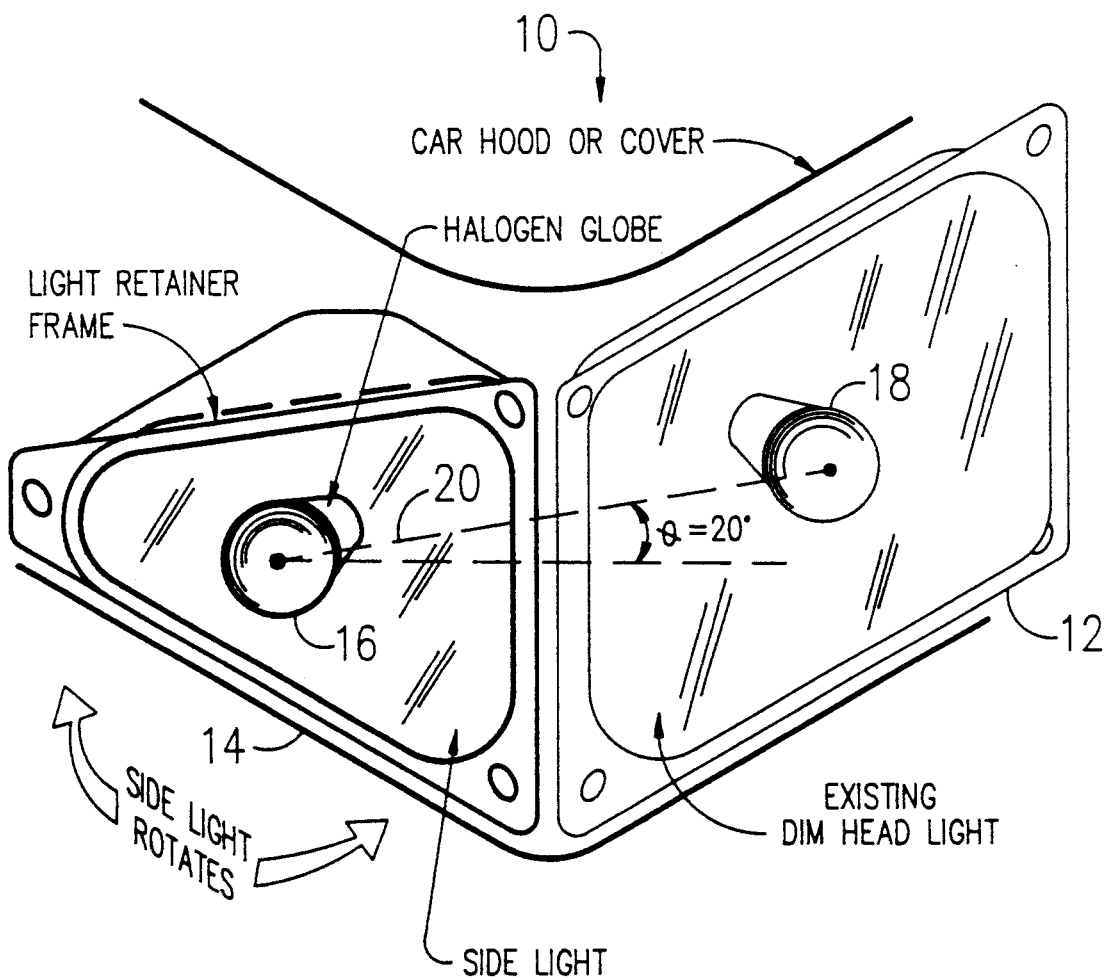
FIG. 1B is an isometric view showing the relative size, offset, and rotational ability of this automobile sidelamp construction.

Referring now to FIGS. 1A and 1B, the combination headlamp-sidelamp is designated generally as 10, and includes a main headlamp portion or section 12 mounted in a fixed position as shown and mounted adjacent to a rotatable sidelamp section 14 of somewhat smaller size. The globe 16 of the sidelamp section 14 is vertically offset with respect to the globe 18 of the headlamp section, and the line 20 joining the center point of the two globes 16 and 18 is slanted or angled with respect to horizontal by about twenty degrees. Advantageously, the globe 16 may be connected to the dimmer circuit for the main headlamp bulb 18 in order to be switched on simultaneously when the dimmer filament in the main headlamp bulb 18 is switched on. However, as described below, the sidelamp bulb 16 may also be switched on in combination with either other automobile lighting functions or manually and independently of any other automobile lighting functions.

Figure 2B:
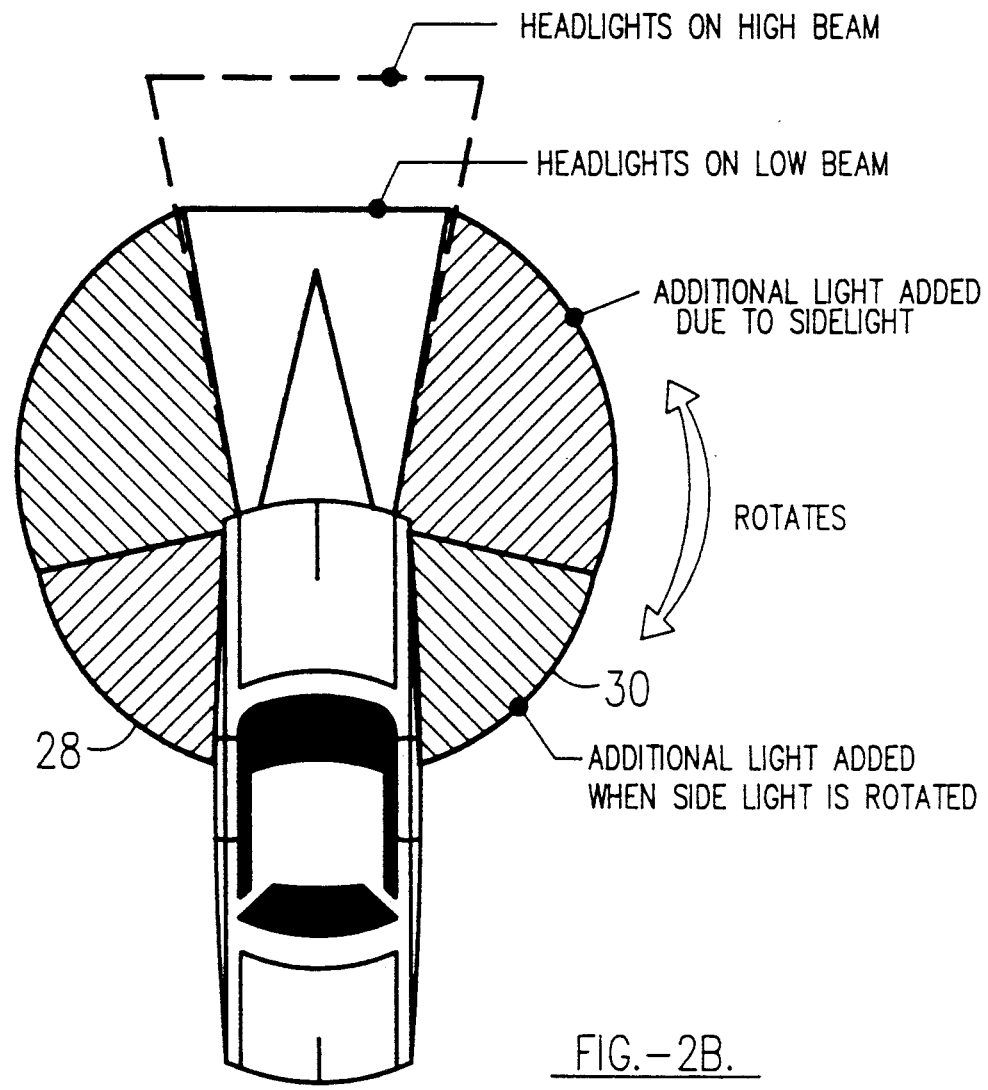
FIG. 2B is a plan view illustrating the field of view of the sidelamp when it is rotated approximately ninety degrees with respect to its field of view in FIG. 2A.

Referring now to FIG. 2A, it is seen that when the automobile headlamp is switched to a low beam to project an effective illumination distance at the line or boundary 22, the sidelamp is switched on to provide the respective left hand and right hand field of views 24 and 26 in a smooth, swept-around contour as indicated. This type of illumination might be desirable, for example, when an automobile has come to a stop in order to allow the driver or passengers to obtain a good survey or feel or "lay of the land" of the general area where the automobile has come to a stop. Then, if the driver or one or more passengers chooses to leave the automobile at night, then the field of views 24 and 26 may be rotated by approximately ninety degrees to the positions 28 and 30, respectively, as shown in FIG. 2B. This sweeping ability for the two sidelamp 14 on each side of the automobile is particularly desirable and useful in the assistance of elderly or infirmed passengers wishing to depart the automobile at night, particularly at a location with which the passengers or driver are not familiar. Thus, instead of having to rely upon either flashlights or other automobile lighting fixtures, the sidelamp arrangement according to the present invention may be easily and automatically rotated ninety degrees with the mere pressing of a button or closing of a switch in order to change the surveillance field of view from the forward looking positions 24 and 26 in FIG. 2A to the sideward looking positions 28 and 30 as shown in FIG. 2B.

Referring again to FIG. 2B, the ability to rotate the field of illumination of the sidelamp from the areas 24 and 26 in FIG. 2A to the adjacent areas 28 and 30 in FIG. 2B gives the automobile driver the ability to illuminate his well known "blind spot" located just beyond his peripheral vision boundary. This feature is extremely useful, for example, where the driver is travelling in a dark isolated area at night and does not want to resort to the operation of a hand flashlight or the like to cast light to his "blind spot".

Figure 3:
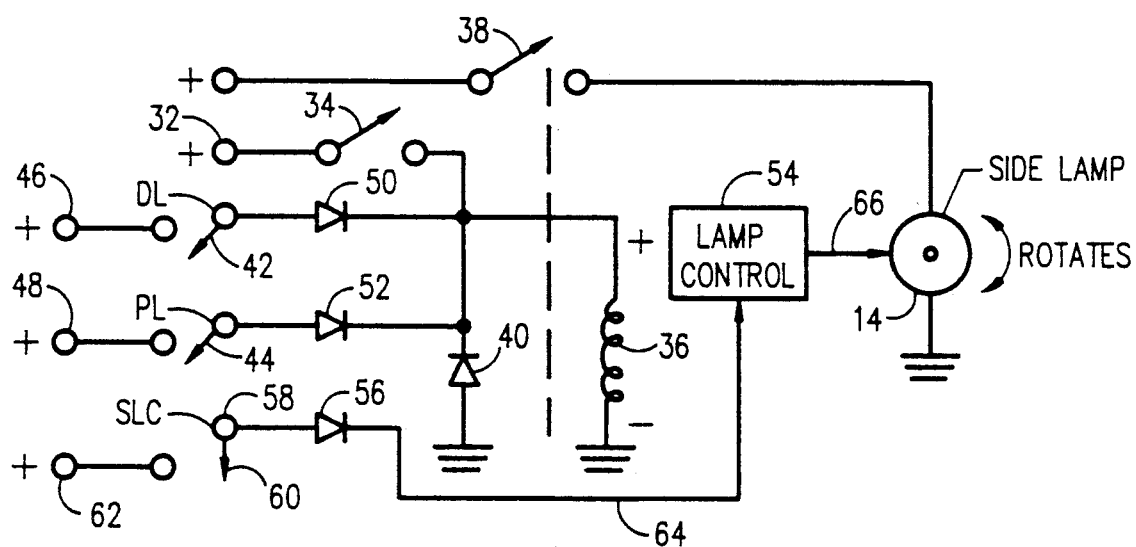
FIG. 3 is a schematic logic diagram of a switching circuit useful for both switching the sidelamp in the above figures on and off and also for controlling the rotational motion thereof.

Referring now to FIG. 3, there is shown one suitable type of switching circuit which may be used for both energizing and rotating the sidelamp section 14 of the assembly shown in FIG. 1B. The circuit in FIG. 3 will include, for example, a DC power circuit having a positive voltage terminal 32 which may be connected through a manual switch 34 in order to provide an energizing voltage to a relay coil 36, which is in turn operable to close relay contacts 38 and provide power for turning on the lamp 14. A transient suppressor diode 40 is connected as shown in parallel with the inductance relay coil 36 in order to clamp the high transient voltages generated across the coil 36 when it is energized and de-energized and thereby prevent these high transient voltages from being fed back into the other diode logic circuitry described below.

If it is desired to energize the sidelamp 14 in combination with other automobile lighting functions, such as turning on the sidelamp 14 simultaneously with an automobile dome light or panel light, this may be accomplished by the use of the parallel connected switches 42 and 44. The switch 42 is designated as the dome light or "DL" switch, whereas the switch 44 is designated as the panel light or "PL" switch, and these switches 42 and 44 are connected to voltage supply terminals 46 and 48 as shown. The current isolating diodes 50 and 52 serve to interconnect the two switches 42 and 44, respectively, to the relay coil 36 for energizing the coil 36 and closing the switch 38 to energize the sidelamp 14 simultaneously with the turning on of either the dome light (DL) or the panel light (PL) within the automobile.

In addition to the above energizing and de-energizing of the sidelamp 14, this lamp 14 may be rotated in both a horizontal and vertical plane by the use of conventional lamp control mechanisms indicated functionally at stage 54 which is connected through another current isolating diode 56 to a sidelamp control (SLC) terminal 58. The SLC terminal 58 is connected as shown through another switch 60 to a voltage supply terminal 62. Thus, by the closing of the SLC switch 60, a DC voltage may be applied by way of line 64 to the lamp control stage 54 to thereby initiate either horizontal or vertical rotational motion to the lamp 14 as indicated in FIG. 3.

Thus, there has been described a novel headlamp, sidelamp arrangement and associated method of operation wherein not only has the sidelamp been integrated as part of the headlamp design in a smooth and ornamental wrap-around multifunctional design, but in addition, the sidelamp 14 may be automatically rotated ninety degrees to aid passengers departing the vehicle at night in an unfamiliar location.

Various modifications may be made in and to the above described embodiment without departing from the spirit and scope of this invention. For example, the circuit described above with reference to FIG. 3 may be modified to respond to accelerometers or the like to thereby automatically turn the sidelamp 14 on in response to abrupt changes in automobile acceleration. This feature will be particularly advantageous in nighttime situations where extreme braking is used to avoid an accident.

Another illumination capability within the scope of this invention would be illuminate either or both fields of illumination 24, 26 and 28, 30 simultaneously or separately. This illumination capability means that the entire hatched area in FIG. 2B can be illuminated at one time, thereby enabling an automobile driver to automatically maximize his peripheral vision at night while travelling in a dark isolated area. Alternatively, however, the lamp control stage 54 in FIG. 3 may be provided with linear rotational control so as to be able to linearly sweep and stop the field of illumination of the sidelamp 14 at any desired side angle with respect to the forward direction of automobile travel.

Accordingly, it should be understood that such modifications to both the lamp design, switching circuitry and method of operation may be made by those skilled in the art without departing from the scope of the following appended claims.

What is claimed is:

1. In combination, a headlamp and sidelamp apparatus for an automobile wherein said sidelamp is rotatably mounted adjacent to said headlamp and having an initial and rotatable field of view which joins each side of the field of view of said headlamp and is operative upon receipt of lamp control motion signals to be rotated to a second field of view which is approximately ninety degrees displaced with respect to said initial field of view of said sidelamp to thereby rapidly aid and assist passengers in departing from the automobile at night in an unfamiliar location, lamp control means connected to said sidelamp for rotating and sweeping the field of illumination of said sidelamp to a chosen side angle field of view extending to 180 degrees with respect to the forward direction of travel of said automobile, thereby providing automatic blind spot illumination for a driver travelling in a dark area.

2. A method for assisting passengers in entering or exiting a motor vehicle or in assisting the vehicle's driver or passengers therein for enhancing a field of vision extending approximately 180° around the side of a vehicle and with respect to the direction of vehicle travel, said method comprising the steps of:

a. providing a side lamp adjacent to a headlamp for said vehicle and having a field of view initially adjacent to said field of view of said headlamp, and b. rotating said sidelamp in response to an electrical control signal through an angle which may operatively extend all the way around the sides of said vehicle and bounded at its position of extreme rotation by the sidewalls and doors of said vehicle.

3. The method defined in claim 2 which further includes:

a. connecting a lamp control stage and an associated control mechanism between a source of DC voltage and said sidelamp, and b. operating said lamp control stage in response to a DC voltage and current provided through a sidelamp control switch for rotating said sidelamp with either horizontal or vertical rotational motion, or both, within the above said 180° rotational angle for said sidelamp.

4. The combination defined in claim 1 wherein said lamp control means includes: a lamp control stage responsive to a DC voltage applied thereto by the closing of a sidelamp control switch for thereby operating a conventional lamp control mechanism and initiating either horizontal or vertical rotational motion to said sidelamp within said chosen side angle field extending from adjacent said field of view of said sidelamp to 180° with respect to the forward direction of travel of said automobile.

* * * * *